(12) United States Patent
Nagaoka et al.

(10) Patent No.: US 11,173,693 B2
(45) Date of Patent: Nov. 16, 2021

(54) VINYLIDENE FLUORIDE-BASED RESIN MULTI-LAYERED FILM

(71) Applicant: DENKA COMPANY LIMITED, Tokyo (JP)

(72) Inventors: Kouta Nagaoka, Isesaki (JP); Keiji Takano, Isesaki (JP)

(73) Assignee: Denka Company Limited, Toyko (JP)

( * ) Notice: Subject to any disclaimer, the term of this patent is extended or adjusted under 35 U.S.C. 154(b) by 0 days.

(21) Appl. No.: 16/765,124

(22) PCT Filed: Nov. 26, 2018

(86) PCT No.: PCT/JP2018/043339
§ 371 (c)(1),
(2) Date: May 18, 2020

(87) PCT Pub. No.: WO2019/107302
PCT Pub. Date: Jun. 6, 2019

(65) Prior Publication Data
US 2021/0245484 A1     Aug. 12, 2021

(30) Foreign Application Priority Data

Nov. 28, 2017    (JP) .............................. JP2017-227959

(51) Int. Cl.
*B32B 27/30*        (2006.01)
*B32B 27/08*        (2006.01)
(Continued)

(52) U.S. Cl.
CPC ............ *B32B 27/304* (2013.01); *B32B 27/08* (2013.01); *B32B 27/18* (2013.01); *B32B 27/308* (2013.01);
(Continued)

(58) Field of Classification Search
CPC combination set(s) only.
See application file for complete search history.

(56) References Cited

U.S. PATENT DOCUMENTS

2007/0276107 A1    11/2007   Wada et al.
2013/0202847 A1    8/2013   Konokawa et al.
(Continued)

FOREIGN PATENT DOCUMENTS

JP        H8-267675 A    10/1996
JP        2002-019051 A    1/2002
(Continued)

OTHER PUBLICATIONS

English translation of JP 2016054702 A (Year: 2016).*
(Continued)

*Primary Examiner* — Ramsey Zacharia
(74) *Attorney, Agent, or Firm* — Leydig, Voit & Mayer, Ltd.

(57) ABSTRACT

Disclosed is a vinylidene fluoride-based resin multi-layered film including two layers composed of a front surface layer laminated on a rear surface layer, in which the front surface layer contains 80% by mass or more of a vinylidene fluoride-based resin and 20% by mass or less of a methacrylic acid ester-based resin, the degree of crystallization of the front surface layer is 45% or higher, the ratio occupied by α-crystals in the entire crystal component of the vinylidene fluoride-based resin is 60% or higher, the thickness of the front surface layer is 15 μm or more, and the rear surface layer contains 90% by mass or more of a methacrylic acid ester-based resin.

15 Claims, 2 Drawing Sheets

(51) Int. Cl.
  *B32B 27/18* (2006.01)
  *C08J 5/18* (2006.01)
  *C08K 5/17* (2006.01)
  *C08K 5/3492* (2006.01)

(52) U.S. Cl.
  CPC .................. *C08J 5/18* (2013.01); *C08K 5/17* (2013.01); *C08K 5/3492* (2013.01); *B32B 2250/02* (2013.01); *B32B 2250/03* (2013.01); *B32B 2250/04* (2013.01); *B32B 2307/402* (2013.01); *B32B 2307/71* (2013.01); *B32B 2307/712* (2013.01); *B32B 2307/732* (2013.01); *B32B 2327/12* (2013.01); *B32B 2333/04* (2013.01); *B32B 2451/00* (2013.01); *B32B 2605/08* (2013.01)

(56) References Cited

U.S. PATENT DOCUMENTS

| | | | |
|---|---|---|---|
| 2017/0204297 | A1 | 7/2017 | Hasumi et al. |
| 2018/0244019 | A1 | 8/2018 | Higashikawa et al. |

FOREIGN PATENT DOCUMENTS

| | | |
|---|---|---|
| JP | 2003-236998 A | 8/2003 |
| JP | 2008-012689 A | 1/2008 |
| JP | 2015-160874 A | 9/2015 |
| JP | 2016-054702 A | 4/2016 |
| JP | 2017-074678 A | 4/2017 |
| WO | WO 2006/016618 A1 | 2/2006 |
| WO | WO 2011/142453 A1 | 11/2011 |
| WO | WO 2013/069493 A1 | 5/2013 |
| WO | WO 2016/010013 A1 | 1/2016 |
| WO | WO 2016/199830 A1 | 12/2016 |
| WO | WO 2017/043467 A1 | 3/2017 |

OTHER PUBLICATIONS

European Patent Office, Extended European Search Report in European Patent Application No. 18883871.8 (dated Dec. 8, 2020).
Japan Patent Office, International Search Report in International Application No. PCT/JP2018/043339 (dated Feb. 12, 2019).
Japan Patent Office, International Written Opinion of the International Searching Authority in Application No. PCT/JP2018/043339 (dated Feb. 12, 2019).
International Bureau of WIPO, International Preliminary Report on Patentability in International Application No. PCT/JP2018/043339 (dated Jun. 11, 2020).
Database WPI Week 201704, Thomson Scientific, accompanying the EPO Communication (See Doc. No. AW below) dated Jun. 11, 2021.
European Patent Office, Communication Pursuant to Article 94(3) EPC in European Patent Application No. 18883871.8 (dated Jun. 11, 2021).

* cited by examiner

VINYLIDENE FLUORIDE-BASED RESIN MULTI-LAYERED FILM

CROSS-REFERENCE TO RELATED APPLICATIONS

This patent application is the U.S. national phase of International Application No. PCT/JP2018/043339, filed on Nov. 26, 2018, which claims the benefit of Japanese Patent Application No. 2017-227959, filed Nov. 28, 2017, the disclosures of which are incorporated herein by reference in their entireties for all purposes.

TECHNICAL FIELD

The present invention relates to a vinylidene fluoride-based resin multi-layered film.

BACKGROUND ART

There has hitherto been a demand for fluorine-based resin multi-layered films that can be used under severe conditions and for a long time period.

Thus, a fluorine-based resin film having a thickness of 10 to 50 μm and formed from a fluorine-based resin composition obtained by adding 10 to 30 parts by mass of titanium oxide or a composite oxide-based inorganic pigment to 100 parts by mass of the sum of resin components composed of 60 to 95 parts by mass of a vinylidene fluoride-based resin and 5 to 40 parts by mass of a methacrylic acid ester-based resin, characterized in that in a measurement chart based on an infrared absorption spectrum, when the peak height at 840 cm$^{-1}$ is designated as (A), and the peak height at 765 cm$^{-1}$ is designated as (B), the peak intensity ratio of α type crystals represented by (B)/((A)+(B))×100 is 60% or higher, and the overall degree of crystallization calculated from an X-ray diffraction profile is 30% or higher, has been developed (Patent Literature 1).

The fluorine-based resin film of Patent Literature 1 was developed in mind that the fluorine-based resin film is used as a backsheet for a solar cell module.

According to this fluorine-based resin film, since a film that has excellent weather resistance and dimensional stability and undergoes less discoloration particularly in a humid and hot environment is obtained, the fluorine-based resin film can be suitably used as a backsheet for a solar cell module.

Furthermore, fluorine-based resin multi-layered films are also used as, for example, films for car exterior decoration in addition to backsheets for solar cell modules, and for the purpose of measures for ultraviolet radiation, incorporating an ultraviolet absorber into a particular layer of the multi-layered film has been practiced. However, even such films have a problem that discoloration of the films occurs when the films are exposed to a humid and hot environment for a long time period.

Furthermore, particularly, with regard to the car exterior decoration, since rainwater easily accumulates on horizontal sites such as the roof and the engine hood, and yellowing of the film also occurs due to acid rain in a high-temperature environment, resistance to acid rain is required.

Here, the acid rain is a mixture of acids including nitric acid and sulfuric acid, which result from nitrogen oxides and sulfur oxides dissolved in water.

CITATION LIST

Patent Literature

Patent Literature 1: International Publication WO 2013/069493

SUMMARY OF INVENTION

Technical Problem

A conventional vinylidene fluoride-based resin multi-layered film contains a large amount of polyvinylidene fluoride in the front surface layer and contains a large amount of a methacrylic acid ester-based resin in the rear surface layer. Incorporation of a large amount of polyvinylidene fluoride in the front surface layer is intended for imparting weather resistance, and incorporation of a large amount of a methacrylic acid ester-based resin in the rear surface layer is intended for imparting heat lamination properties.

With regard to such a conventional vinylidene fluoride-based resin multi-layered film, it was found that when the resistance to acid rain in a high-temperature environment is evaluated using a chemical solution resembling acid rain, there is a problem that the chemical solution penetrates up to the rear surface layer and causes coloration by oxidizing acryl.

Incidentally, as conventional decorative films that are used for films for car exterior decoration, films having a configuration in which a decorative layer formed from PVC or ABS is heat-laminated on the rear surface layer of the vinylidene fluoride-based resin multi-layered film have been widely used.

Many of the above-mentioned decorative layers have hindered amine-based light stabilizers (hereinafter, may be referred to as "HALS") incorporated therein in order to suppress photodegradation. However, hindered amine-based light stabilizers have a problem that the hindered amine-based light stabilizers migrate toward the vinylidene fluoride-based resin multi-layered film side in a high-temperature environment to which car exterior decoration is exposed, a polyene structure is produced in the main chain of the vinylidene fluoride-based resin in a basic environment caused by amine, and yellowing occurs.

Solution to Problem

Thus, the inventors of the present invention conducted a thorough investigation in order to solve the above-described problems, and finally completed the present invention.

That is, there is provided a vinylidene fluoride-based resin multi-layered film including two layers composed of a front surface layer laminated on a rear surface layer, in which the front surface layer contains 80% by mass or more of a vinylidene fluoride-based resin and 20% by mass or less of a methacrylic acid ester-based resin, the degree of crystallization of the front surface layer is 45% or higher, the ratio occupied by α-crystals in the entire crystal component of the vinylidene fluoride-based resin is 60% or higher, the thickness of the front surface layer is 15 μm or more, and the rear surface layer contains 90% by mass or more of a methacrylic acid ester-based resin.

When a white thermoplastic resin layer is laminated immediately beneath the rear surface layer of the vinylidene fluoride-based resin multi-layered film, and in a state in which the thermoplastic resin layer has been heated to 80°

C., 500 μl of an acidic aqueous solution at pH 1 is dropped on the front surface layer side, it is preferable that the change in the degree of yellowness, Δb, after 3 hours and 30 minutes is 2 or less.

Furthermore, regarding the vinylidene fluoride-based resin multi-layered film, when a white thermoplastic resin layer containing a hindered amine-based light stabilizer is laminated immediately beneath the rear surface layer, and the thermoplastic resin layer is put in a dark place in an environment at 80° C. for 600 hours, it is preferable that the change in the degree of yellowness, Δb, is 2 or less.

The vinylidene fluoride-based resin may contain a copolymer of vinylidene fluoride and hexafluoropropene and/or polyvinylidene fluoride.

Furthermore, the rear surface layer may contain 10% by mass or less of a vinylidene fluoride-based resin.

Furthermore, the rear surface layer may contain a triazine-based ultraviolet absorber in an amount of 0.01% to 10% by mass.

Furthermore, it is preferable that the total thickness including the front surface layer and the rear surface layer is 20 to 200 μm.

Furthermore, the vinylidene fluoride-based resin multi-layered film of the present invention may be laminated on a decorative film.

That film may be used as a film for car exterior decoration that decorates the exterior of a car.

Furthermore, a car or an automotive part can be produced by adhering the film for car exterior decoration to the surface.

Advantageous Effects of Invention

According to the present invention, there is provided a vinylidene fluoride-based resin multi-layered film, by which the discoloration of the film caused by acid rain and the discoloration of the film caused by production of a polyene structure by a hindered amine-based light stabilizer included in a decorative film can be suppressed for a long time period in a high-temperature, high-humidity environment.

DESCRIPTION OF EMBODIMENTS

Figure 1:
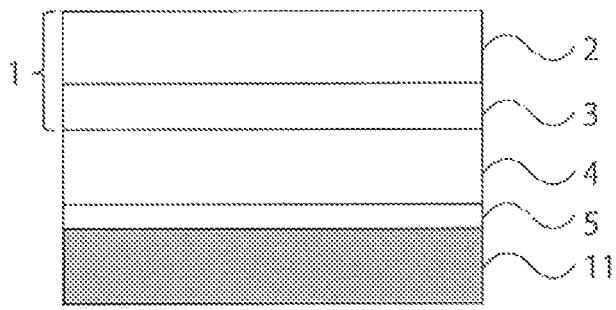
FIG. 1 is a diagram illustrating a structure used for evaluations of the resistance to acid rain and the resistance to yellowing in a dark place.

Hereinafter, suitable embodiments for carrying out the present invention will be described. Meanwhile, the embodiments described below disclose representative embodiments of the present invention, and the scope of the present invention is not intended to be construed thereby to be narrow.

[1. Vinylidene Fluoride-Based Resin Multi-Layered Film]

The vinylidene fluoride-based resin multi-layered film of the present invention may be composed of two layers having a front surface layer laminated on a rear surface layer, or may have another layer laminated on one side or both sides of the two layers.

1-1. Front Surface Layer

The front surface layer contains 80% by mass or more of a vinylidene fluoride-based resin and 20% by mass or less of a methacrylic acid ester-based resin.

The methacrylic acid ester-based resin has excellent compatibility with a vinylidene fluoride-based resin, enhances processability by lowering the extrusion temperature at the time of film extrusion molding, and enhances the adhesiveness at the time of laminating with other materials.

The amount of the methacrylic acid ester-based resin is set to be 20% by mass or less because there is a risk that when the amount of the methacrylic acid ester-based resin component included in the front surface layer is too large, this component is oxidized, and discoloration of the film may occur to a large extent.

Here, a vinylidene fluoride-based resin refers to a homopolymer of vinylidene fluoride or a copolymer of vinylidene fluoride and a monomer that is copolymerizable therewith. Examples of the copolymer include a vinylidene fluoride-tetrafluoroethylene-hexafluoropropylene-based copolymer, a vinylidene fluoride-hexafluoropropylene-based copolymer, and the like.

According to the present invention, from the viewpoint of the compatibility with a methacrylic acid ester-based resin, it is preferable that the vinylidene fluoride-based resin contains preferably a copolymer of vinylidene fluoride and hexafluoropropene and/or polyvinylidene fluoride.

A methacrylic acid ester-based resin refers to a homopolymer of a methacrylic acid ester such as methyl methacrylate, or a copolymer of a methacrylic acid ester such as methyl methacrylate and a monomer that is copolymerizable therewith. Examples of the copolymerizable monomer include methacrylic acid esters having 2 to 4 carbon atom, acrylic acid esters having 1 to 8 carbon atoms, including methyl acrylate and butyl acrylate, styrene, α-methylstyrene, acrylonitrile, acrylic acid, other ethylenically unsaturated monomers, and the like. Preferably, the methacrylic acid ester-based resin is a copolymer of methyl methacrylate and an acrylic acid ester having 1 to 8 carbon atoms, and more preferably a methyl methacrylate copolymer having butyl acrylate or methyl acrylate as a comonomer.

Furthermore, the degree of crystallization of the front surface layer is 45% or higher. It is because when the degree of crystallization is lower than 45%, penetration of acid rain into the rear surface layer cannot be prevented, the methacrylic acid ester-based resin of the rear surface layer is oxidized, and there is a risk that discoloration of the film may occur to a large extent.

The degree of crystallization can be calculated from an X-ray diffraction profile using an X-ray diffraction apparatus.

Furthermore, the ratio occupied by α-crystals in the entire crystal component of the vinylidene fluoride-based resin is 60% or more. It is because when the ratio of α-crystals is less than 60%, penetration of acid rain into the rear surface layer cannot be prevented, the methacrylic acid ester-based resin of the rear surface layer is oxidized, and there is a risk that discoloration of the film may occur to a large extent. The degree of crystallization of the front surface layer and the magnitude of the ratio of α-crystals can together suppress discoloration of the film caused by acid rain.

Regarding the method for measuring the peak intensity ratio of α-crystals, the peak intensity ratio is calculated as follows by the method described in the method of Hanada, et al. (Tomomi Hanada, Yutaka Ando, "Crystallization of polyvinylidene fluoride in polyvinylidene fluoride, polyvinyl acetate, and polymethyl methacrylate blend system", Tokyo Kasei Gakuin University Bulletin, July 1992, No. 32, pp. 5-12).

That is, since the absorption characteristics of β type crystals of a polyvinylidene fluoride resin in an infrared absorption spectrum exist at a wave number of 840 cm$^{-1}$, and the absorption characteristics of α type crystals exist at a wave number of 765 cm$^{-1}$, the component ratio (%) of α type crystals is represented by ((absorption intensity at 765 cm$^{-1}$)/(absorption intensity at 765 cm$^{-1}$+absorption intensity at 840 cm$^{-1}$))×100(%). Therefore, the peak intensity ratio of α type crystals is such that in a measurement chart based on an infrared absorption spectrum, when the peak height at 840 cm$^{-1}$ is designated as (A), and the peak height at 765 cm$^{-1}$ is designated as (B), the peak intensity ratio is represented by (B)/((A)+(B))×100, and a film is formed such that this value reaches 60% or more, preferably 70% to 90%, and more preferably 90% to 100%, in a suitable embodiment of the present invention. Furthermore, the resin component according to the present invention is not identical to the resin component used in the method of Hanada, et al.; however, since there is no change in the absorption characteristics of crystals in the infrared absorption spectrum, the above-described relation formula can be directly utilized also in the composition system according to the present invention.

Furthermore, the thickness of the front surface layer is 15 μm or more. It is because when the thickness is less than 15 μm, acid rain penetrates up to the rear surface layer, the methacrylic acid ester-based resin in the rear surface layer is oxidized, and there is a risk that discoloration may occur to a large extent.

Furthermore, it is preferable that the thickness is 100 μm or less. Even if the thickness is 100 μm or less, the resistance to acid rain is sufficiently guaranteed, and the thickness is also acceptable from the viewpoint of handleability as a film for car exterior decoration. It is also preferable from the viewpoint that the cost of the vinylidene fluoride-based resin is suppressed.

1-2. Rear Surface Layer

The rear surface layer contains 90% by mass or more of a methacrylic acid ester-based resin. Furthermore, the rear surface layer may contain 10% by mass or less of a vinylidene fluoride-based resin; however, the components are not limited to these.

The composition of the methacrylic acid ester-based resin and the like is as described above.

The rear surface layer is laminated on a decorative layer; however, a hindered amine-based light stabilizer included in the decorative layer migrates to the rear surface layer, and a polyene structure is formed within the skeleton of the vinylidene fluoride-based resin that is included in a small amount in the rear surface layer due to the hindered amine-based light stabilizer. Since the polyene structure absorbs light, the polyene structure causes the film to appear yellow. Therefore, the rear surface layer is made into a methacrylic acid ester-based resin-rich layer by reducing the amount of the vinylidene fluoride-based resin.

1-3. Ultraviolet Absorber Contained in Rear Surface Layer

It is preferable that the rear surface layer of the vinylidene fluoride-based resin film contains a triazine-based ultraviolet absorber in an amount of 0.01% to 10% by mass.

Regarding the ultraviolet absorber, generally, benzotriazole-based, benzophenone-based, or triazine-based agents are used; however, preferably, from the viewpoint of the sustainability of an ultraviolet absorption effect, the ultraviolet absorber is a triazine-based ultraviolet absorber.

Examples of the triazine-based ultraviolet absorber include 2-(4-hexyloxy-2-hydroxyphenyl)-4,6-diphenyl-1,3,5-triazine, 2-(4-octyloxy-2-hydroxyphenyl)-4,6-di(2,5-dimethylphenyl)-1,3,5-triazine, 2-(4-butoxy-2-hydroxyphenyl)-4,6-di(4-butoxyphenyl)-1,3,5-triazine, 2-(4-butoxy-2-hydroxyphenyl)-4,6-di(2,4-dibutoxyphenyl)-1,3,5-triazine, 2-(4-(3-(2-ethylhexyloxy)-2-hydroxypropoxy)-2-hydroxyphenyl)-4,6-di(2,4-dimethylphenyl)-1,3,5-triazine, 2-(4-(3-dodecyloxy-2-hydroxypropoxy)-2-hydroxyphenyl)-4,6-di(2,4-dimethylphenyl)-1,3,5-triazine, 2,4-di(4-butoxy-2-hydroxyphenyl)-6-(4-butoxyphenyl)-1,3,5-triazine, 2,4-di(4-butoxy-2-hydroxyphenyl)-6-(2,4-dibutoxyphenyl)-1,3,5-triazine, 2-(4,6-diphenyl-1,3,5-triazin-2-yl)-5-[(hexyl)oxy]phenol, and the like; however, the examples are not limited to these.

It is preferable that the triazine-based ultraviolet absorber is contained in an amount of 0.01% to 10% by mass with respect to the total amount of the composition of the material forming the rear surface layer. When the amount is 0.01% or more, it is preferable from the viewpoint that a sufficient ultraviolet absorption effect is obtained, and when the amount is 10% by mass or less, it is preferable from the viewpoint that transparency of the film is not inhibited, and there is no contamination of the film surface caused by bleed-out. More preferably, the amount is 4% to 5% by mass. With this amount, an ultraviolet absorption effect is sufficiently obtained, and the transparency of the vinylidene fluoride-based resin film as a whole is not inhibited.

1-4. Two Layers Composed of Front Surface Layer Laminated on Rear Surface Layer

Here, another layer may be further laminated on the front surface layer and/or the rear surface layer. The other layer is, for example, a decorative layer, a protective layer, a tacky adhesive layer, a print layer, a metal deposit layer, or the like. When the total thickness including these layers is 20 to 200 μm, it is preferable from the viewpoints of the workability of adhesion to car exterior and interior decoration parts, and the cost.

For example, in a decorative layer, an acrylic resin, a polycarbonate resin, a vinyl chloride-based resin, a polyester-based resin, a resin composition including these resins as components, or the like can be used. Furthermore, additives such as a pigment can also be appropriately added.

A polyester-based resin has satisfactory surface glossiness, has excellent print suitability, and the like, and therefore, a polyester-based resin is subjected to plating or metal-tone printing and used for panel component parts of cars, mobile telephones, and the like.

An acrylic resin sheet has excellent weather resistance, has moldability that follows even to a shape having a high degree of deep drawing, and has excellent adhesiveness to an acrylonitrile-butadiene-styrene copolymer resin. Therefore, an acrylic resin sheet is adequate for the decoration of the surface of a molded body having this resin as a base material.

The decorative layer may include a hindered amine-based light stabilizer (HALS or the like). A HALS is a basic substance that prevents deterioration caused by light. A HALS may migrate to the rear surface layer in a high-temperature environment and may further migrate to the front surface layer. Then, a polyene structure is produced in the vinylidene fluoride-based resin in a basic environment due to the HALS, and thereby the vinylidene fluoride-based resin film undergoes yellowing.

However, when the vinylidene fluoride-based resin film of the present invention is used, even if the HALS in the decorative layer migrates to the rear surface layer and arrives at the front surface layer, since the degree of crystallization of the front surface layer is 45% or higher, and the ratio of α-crystals is 60% or higher, the production of a polyene structure is suppressed, and discoloration can be suppressed over a long time period.

That is, even if the vinylidene fluoride-based resin film has a two-layer structure in which a front surface layer is directly laminated on a back surface layer, and the rear surface layer is a methacrylic acid ester-based resin-rich layer, when the degree of crystallization of the front surface layer is less than 45%, or the ratio of α-crystals is less than 60%, in a case in which a hindered amine-based light stabilizer from the decorative layer arrives at the front surface layer, a polyene structure is produced, and yellowing occurs. Therefore, hue stability cannot be maintained over a long time period.

Meanwhile, in the front surface layer and/or the rear surface layer, any arbitrary other additive components can also be incorporated, in addition to an ultraviolet absorber, to the extent that does not impair the effects of the present invention. For example, a pigment, a filler material, a stabilizer, a dispersant, an oxidation inhibitor, a delustering agent, a surfactant, an antistatic agent, a fluorine-based surface modifying agent, a processing aid, and the like can be added.

Furthermore, as another layer other than the decorative layer, the multi-layering with films of isotactic or syndiotactic polypropylene, high-density polyethylene, low-density polyethylene, polystyrene, polyethylene terephthalate, an ethylene-vinyl acetate copolymer (EVA), and the like can be achieved, and various decoration treatments, for example, embossed molding and the like can also be carried out.

[2. Ultraviolet Cutting Performance (Foundation Protective Properties) of Vinylidene Fluoride-Based Resin Film]

The vinylidene fluoride-based resin film of the present invention is laminated on a decorative layer that serves as a foundation, the laminate is irradiated with ultraviolet radiation and is subjected to a weather resistance acceleration test, and thus the change in the degree of yellowness, Δb, of the sample before and after the test can be evaluated. The details will be described in Examples.

When an ultraviolet absorber is included in the vinylidene fluoride-based resin film of the present invention, discoloration can be prevented.

[3. Resistance to Acid Rain of Vinylidene Fluoride-Based Resin Film]

The degree of suppression of discoloration against acid rain of the vinylidene fluoride-based resin film of the present invention is significantly higher than that of conventional vinylidene fluoride-based resin films The evaluation method therefor is not generalized in the pertinent art; however, the degree of suppression of discoloration can be objectively evaluated by the following method. Here, an outline is described, and the details will be described in Examples.

First, a white thermoplastic resin layer is laminated immediately beneath the rear surface layer of the vinylidene fluoride-based resin film, preferably by heat lamination. The white thermoplastic resin layer is regarded as the decorative layer. The conditions for lamination are preferably such that the temperature of the heating roller is 140° C., and the treatment rate is 1 m/min.

Next, in a state in which the white thermoplastic resin layer has been heated to 80° C., 500 μl of an acidic aqueous solution at pH 1 resembling acid rain is dropped on the front surface layer side of the vinylidene fluoride-based resin film. The vinylidene fluoride-based resin film is heated, and then after 3 hours and 30 minutes, the change in the degree of yellowness, Δb, is measured from the front surface layer side using a spectral colorimeter ZE6000 (manufactured by NIPPON DENSHOKU INDUSTRIES CO., LTD.).

It is preferable that the change in the degree of yellowness, Δb, of the vinylidene fluoride-based resin film of the present invention is 2 or less. When the change is 2 or less, even if the vinylidene fluoride-based resin film is exposed to acid rain in a high-temperature environment over a long time period, discoloration occurs to a reduced extent, and the initial shape and color of the decorative layer can be maintained. Therefore, it is preferable. More preferably, the change in the degree of yellowness is 1.0, and even more preferably 0.5. With a change in the degree of yellowness of this degree, the shape and color of the decorative layer can be visually recognized clearly and vividly over several dozen years.

[4. Resistance to Yellowing in Dark Place of Vinylidene Fluoride-Based Resin Film]

The degree of suppression of discoloration in a dark place of the vinylidene fluoride-based resin film of the present invention is significantly higher than that of conventional vinylidene fluoride-based resin films. The evaluation method therefor is not generalized in the pertinent art; however, the degree of suppression of discoloration can be objectively evaluated by the following method. Here, an outline is described, and the details will be described in Examples.

First, a white thermoplastic resin layer containing a hindered amine-based light stabilizer is laminated immediately beneath the rear surface layer of the vinylidene fluoride-based resin film, preferably by heat lamination. The white thermoplastic resin layer is regarded as the decorative layer. Furthermore, the hindered amine-based light stabilizer is not particularly limited.

Next, a laminated body of this vinylidene fluoride-based resin film and the thermoplastic resin layer is put in a dark plate in an environment at 80° C. for 600 hours, and then the change in the degree of yellowness, Δb, is measured.

It is preferable that the change in the degree of yellowness, Δb, of the vinylidene fluoride-based resin film of the present invention is 2 or less. When the change is 2 or less, even if the vinylidene fluoride-based resin film is exposed to a high-temperature environment over a long time period, discoloration occurs to a reduced extent, and the initial shape and color of the decorative layer can be maintained. Therefore, it is preferable. More preferably, the change in the degree of yellowness is 1.0. With a change in the degree of yellowness of this degree, the shape and color of the decorative layer can be visually recognized clearly over several dozen years or longer.

[5. Melt Mass Flow Rates of Front Surface Layer and Rear Surface Layer]

The absolute value of the difference between the melt mass flow rates (hereinafter, may be referred to as "MFR") of the front surface layer and the rear surface layer of the vinylidene fluoride-based resin film of the present invention as measured at 240° C. by applying a load of 2.16 kgf, is preferably 0.5 to 5.0 g/10 min, and more preferably 1.0 to 2.0 g/10 min. Alternatively, it is preferable that the MFRs of the front surface layer and the rear surface layer are 0.5 to 25.0 g/10 min and 0.5 to 25.0 g/10 min, respectively. However, there are no particular limitations.

When the absolute value of the difference between the MFRs of the front surface layer and the rear surface layer is 0.5 to 5.0 g/10 min, at the time of laminating the two layers, the interface of the two layers becomes smooth, and defects in the external appearance, such as melt fracture, do not easily occur. Therefore, it is preferable. Furthermore, when the absolute value is 1.0 to 2.0 g/10 min, melt fracture does not easily occur, and the layer configuration is likely to become uniform over the entire width of the film. Therefore, it is more preferable.

The MFR can be evaluated by the standard testing method for the melt mass flow rate (MFR) of a thermoplastic plastic according to JIS K7210-1 of Japanese Industrial Standards.

[6. Method for Producing Vinylidene Fluoride-Based Resin Film]

The method for producing a vinylidene fluoride-based resin film of the present invention is not particularly limited; however, the film can be conveniently produced according to a melt extrusion molding method that has been conventionally used.

Specifically, a T-die method of producing a film using a T-type die, and a method of producing a film using an inflation die are available. The conditions for extrusion are not particularly limited, and any conditions that are generally used for molding a vinylidene fluoride-based resin film can be utilized.

For the T-die method, either a method in which a metal cooling roll and a rubber roll are disposed under a T-type die, and a molten resin extruded through a lip port of the T-type die is pinched between the above-mentioned rolls and solidified by cooling, and thereby producing a film; or a method of producing a film by solidifying a molten resin by cooling only with a metal cooling roll, without using a pinch roll, can be employed. In both cases, it is preferable that the amount of conversive heat per unit time at the time of cooling the molten resin is 70 to 180 KW per kg of the molten resin according to a calculation formula represented by the following formula.

Amount of conversive heat=Specific heat (J/kg·° C.) of resin composition×$\Delta T$/cooling time (sec)

Here, $\Delta T$=Temperature of molten resin−temperature after cooling.

For example, the amount of conversive heat per kg of a molten resin at the time of melting a resin composition used for the vinylidene fluoride-based resin film of the present invention to 230° C. and cooling the resin composition to 60° C. after 2 seconds, is 94 KW. When the amount of conversive heat is less than 70 KW, there is a risk that the mold releasability from the cooling roll may become poor due to insufficient cooling, and when the amount of conversive heat is more than 180 KW, the vinylidene fluoride-based resin film having a crystal structure of the present invention may not be obtained. The film thus extrusion molded preferably acquires a thickness of 30 to 100 μm in a state of being solidified by cooling.

[7. Film for Car Exterior Decoration, and Car or Automotive Part Using This]

The vinylidene fluoride-based resin multi-layered film of the present invention has excellent weather resistance and excellent resistance to acid rain, and therefore, a film for car exterior decoration having an excellent decoration effect brought by a decorative layer can be provided. Furthermore, when a protective layer and the like are laminated on the front surface layer, scratch resistance, water repellency, and the like can also be further imparted.

Since the film for car exterior decoration also has excellent handleability, the film for car exterior decoration can cope with large parts such as the engine hood and the roof, as well as small parts.

Here, particularly, the engine hood and the roof are horizontal, and when they are hit by sunlight, the temperature increases. When acid rain hits there, acid easily penetrates into the outermost layer film of the engine hood or the roof, and yellowing occurs. However, when the vinylidene fluoride-based resin multi-layered film of the present invention is used, since the vinylidene fluoride-based resin multi-layered film has high resistance to acid rain, yellowing does not occur.

EXAMPLES

Hereinafter, the present invention will be described in more detail based on Examples. Meanwhile, Examples that will be described below represent examples of the representative Examples of the present invention, and it is noted that the scope of the present invention will not be construed to be narrow thereby.

<Raw Materials Used>

The raw materials used in Present Examples and Comparative Examples will be shown below. In a case in which two or more kinds of raw materials were used as mixtures, the respective raw materials were preliminarily mixed in an unmelted state, subsequently the mixture was melted in a melt mixing facility, and thereby the mixture was mixed uniformly. Subsequently, the mixture was extruded into a strand form and cooled, and then cut into a pellet form. The resultant was used as a raw material.

(Vinylidene Fluoride-Based Resin)

Polyvinylidene fluoride, Kynar "1000HD", manufactured by Arkema S.A.

Polyvinylidene fluoride, Kynar "K720", manufactured by Arkema S.A.

(Methacrylic Acid Ester-Based Resin)

Polymethyl methacrylate (PMMA), SUMIPEX "MGSS", manufactured by Sumitomo Chemical Company, Limited Methacrylic acid ester-based resin, HIPET "HBS000", manufactured by Mitsubishi Chemical Corporation (Ultraviolet Absorber)

Tinuvin 1577ED, manufactured by BASF SE

<Production Method in Examples and Comparative Examples>

According to the compounding formulations for the front surface layer and the compounding formulations for the rear surface layer of Examples 1 to 7 described in Table 1 and Comparative Examples 1 to 5 described in Table 2, kneading was performed using a ɸ30-mm twin-screw extruder, and then the respective compounds were obtained.

Next, each of the compounds described above was subjected to T-die film formation using a ɸ40-mm single-screw extruder at an extrusion temperature of 250° C., and a film having a predetermined thickness was obtained. The production of the vinylidene fluoride-based resin multi-layered films of Examples and Comparative Examples were carried out according to the conditions described in Table 3.

TABLE 1

| | | | Example 1 | Example 2 | Example 3 | Example 4 | Example 5 | Example 6 | Example 7 |
|---|---|---|---|---|---|---|---|---|---|
| Raw material formulations for surface protective films | Compounding formulation for front surface layer | Type of vinylidene fluoride-based resin Mixing amount [% by mass] Type of methacrylic acid ester-based resin | ①1000HD ②K720 ①60 ②30 MGSS | ①1000HD ②K720 ①55 ②25 MGSS | ①1000HD ②K720 ①65 ②35 MGSS | ①1000HD ②K720 ①60 ②30 MGSS | ①1000HD ②K720 ①60 ②30 MGSS | ①1000HD ②K720 ①60 ②30 MGSS | ①1000HD ②K720 ①60 ②30 MGSS |

TABLE 1-continued

| | | | Example 1 | Example 2 | Example 3 | Example 4 | Example 5 | Example 6 | Example 7 |
|---|---|---|---|---|---|---|---|---|---|
| | Compounding formulation for rear surface layer | Mixing amount [% by mass] | 10 | 20 | 0 | 10 | 10 | 10 | 10 |
| | | Type of vinylidene fluoride-based resin | K720 | K720 | K720 | K720 | K720 | K720 | K720 |
| | | Mixing amount [% by mass] | 0 | 0 | 0 | 10 | 0 | 0 | 0 |
| | | Type of methacrylic acid ester-based resin | HBS000 | HBS000 | HBS000 | HBS000 | HBS000 | HBS000 | HBS000 |
| | | Mixing amount [% by mass] | 100 | 100 | 100 | 90 | 100 | 100 | 100 |
| | | Type of ultraviolet absorber | Tinuvin 1577ED | Tinuvin 1577ED | Tinuvin 1577ED | Tinuvin 1577ED | Tinuvin 1577ED | Tinuvin 1577ED | Tinuvin 1577ED |
| | | Mixing amount with respect to 100 parts by mass of resin [parts by mass] | 4.4 | 4.4 | 4.4 | 4.4 | 4.4 | 4.4 | 4.4 |
| MFR of raw material (240° C., 2.16 kgf) | | Front surface layer | 2.6 | 2.4 | 2.8 | 2.6 | 2.6 | 2.6 | 2.6 |
| | | Rear surface layer | 0.7 | 0.7 | 0.7 | 1.2 | 0.7 | 0.7 | 0.7 |
| Crystal structure of front surface layer | | Degree of crystallization [%] | 65 | 50 | 70 | 65 | 66 | 68 | 50 |
| | | Ratio occupied by α-crystals in entire crystal component [%] | 85 | 80 | 92 | 85 | 90 | 92 | 60 |
| Thickness of surface protective films | | Thickness of resin film [μm] | 50 | 50 | 50 | 50 | 100 | 150 | 50 |
| | | Thickness of front surface layer [μm] | 17 | 17 | 17 | 17 | 34 | 100 | 17 |
| | | Thickness of rear surface layer [μm] | 33 | 33 | 33 | 33 | 66 | 50 | 33 |
| | Specific gravity of front surface layer [g/cm$^3$] | | 1.70 | 1.62 | 1.78 | 1.70 | 1.70 | 1.70 | 1.70 |
| | Specific gravity of rear surface layer [g/cm$^3$] | | 1.19 | 1.19 | 1.19 | 1.24 | 1.19 | 1.19 | 1.19 |
| | Weight of front surface layer in 100 g of film | | 42.4 | 41.2 | 43.5 | 41.4 | 42.4 | 74.1 | 42.4 |
| Performance of surface protective films | Resistance to acid rain | Change in degree of yellowness in reagent-dropped area (Δb) | 1.5 | 1.8 | 0.5 | 1.5 | 1 | 1 | 1.8 |
| | Resistance to yellowing in dark place | Change in degree of yellowness after heat resistance test (Δb) | 1 | 1 | 1 | 1.5 | 1 | 1 | 1 |
| | Ultraviolet cutting performance | Change in degree of yellowness after ultraviolet irradiation test (Δb) | 1.5 | 1.5 | 1.5 | 1.5 | 1 | 1 | 1.5 |

TABLE 2

| | | | Comparative Example 1 | Comparative Example 2 | Comparative Example 3 | Comparative Example 4 | Comparative Example 5 |
|---|---|---|---|---|---|---|---|
| Raw material formulations for surface protective films | Compounding formulation for front surface layer | Type of vinylidene fluoride-based resin | ①1000HD ②K720 | ①1000HD ②K720 | ①1000HD ②K720 | ①1000HD ②K720 | ①1000HD ②K720 |
| | | Mixing amount [% by mass] | ①45 ②25 | ①60 ②30 | ①60 ②30 | ①60 ②30 | ①60 ②30 |
| | | Type of methacrylic acid ester-based resin | MGSS | MGSS | MGSS | MGSS | MGSS |
| | | Mixing amount [% by mass] | 30 | 10 | 10 | 10 | 10 |
| | Compounding formulation for rear surface layer | Type of vinylidene fluoride-based resin | K720 | K720 | K720 | K720 | K720 |
| | | Mixing amount [% by mass] | 0 | 20 | 0 | 0 | 0 |
| | | Type of methacrylic acid ester-based resin | HBS000 | HBS000 | HBS000 | HBS000 | HBS000 |
| | | Mixing amount [% by mass] | 100 | 80 | 100 | 100 | 100 |
| | | Type of ultraviolet absorber | Tinuvin 1577ED | Tinuvin 1577ED | Tinuvin 1577ED | Tinuvin 1577ED | — |
| | | Mixing amount with respect to 100 parts by mass of resin [parts by mass] | 4.4 | 4.4 | 4.4 | 4.4 | — |

TABLE 2-continued

| | | | Comparative Example 1 | Comparative Example 2 | Comparative Example 3 | Comparative Example 4 | Comparative Example 5 |
|---|---|---|---|---|---|---|---|
| MFR of raw material (240° C., 2.16 kgf) | | Front surface layer | 8 | 2.6 | 2.6 | 2.6 | 2.6 |
| | | Rear surface layer | 0.7 | 3.0 | 0.7 | 0.7 | 0.7 |
| Crystal structure of front surface layer | | Degree of crystallization [%] | 40 | 65 | 65 | 30 | 37 |
| | | Ratio occupied by a-crystals in entire crystal component [%] | 50 | 85 | 85 | 20 | 85 |
| Thickness of surface protective films | | Thickness of resin film [μm] | 50 | 50 | 30 | 50 | 50 |
| | | Thickness of front surface layer [μm] | 17 | 17 | 10 | 17 | 17 |
| | | Thickness of rear surface layer [μm] | 33 | 33 | 20 | 33 | 33 |
| | Specific gravity of front surface layer [g/cm³] | | 1.55 | 1.70 | 1.70 | 1.70 | 1.70 |
| | Specific gravity of rear surface layer [g/cm³] | | 1.19 | 1.28 | 1.19 | 1.19 | 1.19 |
| | Weight of front surface layer in 100 g of film | | 40.2 | 40.6 | 41.7 | 42.4 | 42.4 |
| Performance of surface protective films | Resistance to acid rain | Change in degree of yellowness in reagent-dropped area (Δb) | 7 | 2 | 7 | 5 | 1.5 |
| | Resistance to yellowing in dark place | Change in degree of yellowness after heat resistance test (Δb) | 2 | 5 | 5 | 4 | 2 |
| | Ultraviolet cutting performance | Change in degree of yellowness after ultraviolet irradiation test (Δb) | 1.5 | 2 | 5 | 2 | 15 |

TABLE 3

| | | | Example 1 | Example 2 | Example 3 | Example 4 | Example 5 | Example 6 | Example 7 |
|---|---|---|---|---|---|---|---|---|---|
| Production conditions for vinylidene fluoride-based resin multi-layered film | Front surface layer | Set temperature of extruder upon compounding [° C.] | 240 | 240 | 240 | 240 | 240 | 240 | 240 |
| | | Speed of screw rotation upon compounding [RPM] | 340 | 340 | 340 | 340 | 340 | 340 | 340 |
| | | Extrusion rate upon compounding [kg/h] | 52.6 | 52.6 | 52.6 | 52.6 | 52.6 | 52.6 | 52.6 |
| | | Set temperature of extruder upon film production [° C.] | 240 | 240 | 240 | 240 | 240 | 240 | 240 |
| | | Speed of screw rotation upon film production [RPM] | 41 | 41 | 41 | 41 | 82 | 250 | 41 |
| | | Extrusion rate upon film production [kg/h] | 11.6 | 11.6 | 11.6 | 11.6 | 23.2 | 70 | 11.6 |
| | Rear surface layer | Set temperature of extruder upon compounding [° C.] | 240 | 240 | 240 | 240 | 240 | 240 | 240 |
| | | Speed of screw rotation upon compounding [RPM] | 340 | 340 | 340 | 340 | 340 | 340 | 340 |
| | | Extrusion rate upon compounding [kg/h] | 52.6 | 52.6 | 52.6 | 52.6 | 52.6 | 52.6 | 52.6 |
| | | Set temperature of extruder upon film production [° C.] | 220 | 220 | 220 | 220 | 220 | 220 | 220 |
| | | Speed of screw rotation upon film production [RPM] | 50 | 50 | 50 | 50 | 100 | 75 | 50 |
| | | Extrusion rate upon film production [kg/h] | 13.7 | 13.7 | 13.7 | 13.7 | 28 | 21 | 13.7 |
| | Set temperature of extruder/T-die unit [°C.] | | 240 | 240 | 240 | 240 | 240 | 240 | 240 |
| | Set temperature of circulation water of first cooling | | 65 | 65 | 65 | 65 | 65 | 65 | 45 |

TABLE 3-continued

| | | | Comparative Example 1 | Comparative Example 2 | Comparative Example 3 | Comparative Example 4 | Comparative Example 5 |
|---|---|---|---|---|---|---|---|
| Production conditions for vinylidene fluoride-based resin multi-layered film | Front surface layer | Set temperature of extruder upon compounding [° C.] | 240 | 240 | 240 | 240 | 240 |
| | | Speed of screw rotation upon compounding [RPM] | 340 | 340 | 340 | 340 | 340 |
| | | Extrusion rate upon compounding [kg/h] | 52.6 | 52.6 | 52.6 | 52.6 | 52.6 |
| | | Set temperature of extruder upon film production [° C.] | 240 | 240 | 240 | 240 | 240 |
| | | Speed of screw rotation upon film production [RPM] | 41 | 41 | 24.6 | 41 | 41 |
| | | Extrusion rate upon film production [kg/h] | 11.6 | 11.6 | 7 | 11.6 | 11.6 |
| | Rear surface layer | Set temperature of extruder upon compounding [° C.] | 240 | 240 | 240 | 240 | 240 |
| | | Speed of screw rotation upon compounding [RPM] | 340 | 340 | 340 | 340 | 340 |
| | | Extrusion rate upon compounding [kg/h] | 52.6 | 52.6 | 52.6 | 52.6 | 52.6 |
| | | Set temperature of extruder upon film production [° C.] | 220 | 220 | 220 | 220 | 220 |
| | | Speed of screw rotation upon film production [RPM] | 50 | 50 | 30 | 50 | 50 |
| | | Extrusion rate upon film production [kg/h] | 13.7 | 13.7 | 8.2 | 13.7 | 13.7 |
| | | Set temperature of extruder/T-die unit [°C.] | 240 | 240 | 240 | 240 | 240 |
| | | Set temperature of circulation water cooling roll and touch roll [°C.] | 65 of first roll and touch roll | 65 | 65 | 30 | 65 |

<Calculation of Degree of Crystallization (%)>

The degree of crystallization of the front surface layer of the multi-layered film was measured using a high-power X-ray diffraction apparatus (X-ray diffraction apparatus, SmartLab, manufactured by Rigaku Corporation). Measurement conditions will be described below.

X-ray source: Cu-encapsulated tube
Applied voltage/current: 40 kV/40 mA
Measurement range: $10° \leq 2\theta \leq 50°$
Exposure time: 20 minutes
Measurement step: 0.02°
Scan speed: 1°/min
Unit configuration: CBO unit, PB 0.3 selection slit
Solar slit open, PB collimator holder
φ0.1-mm pinhole collimator
Detector: Semiconductor detector (HyPit-3000)
Measurement stage: 2D transmission attachment The data were converted to one-dimensional data using an XRD data analysis software program 2DP (2D data processing), and the profile fitting function of the XRD data analysis software program PDXL (Powder diffraction analysis) was used. After background compensation was carried out, peaks originating from the PVDF crystal structure and halo peaks originating from the amorphous structure were separated in the range of $2\theta=10°$ to 30°, and the respective areas were determined. According to the present invention, since the rear surface layer contained 90% by mass or more of a methacrylic acid ester-based resin and was substantially amorphous, the degree of crystallization of the front surface layer was calculated by the following formula.

Ic=Peak area originating from PVDF crystal structure
Ia=Halo peak area originating from amorphous structure
$M_{FC}$=Weight (g) of vinylidene fluoride-based resin in crystal state existing in front surface layer in 100 g of film
M=Weight (g) of front surface layer in 100 g of film Degree of crystallization (%) of front surface layer=$M_{FC}/M \times 100$ Here, it was defined such that $M_{FC}=Ic/(Ic+Ia) \times 100$
M was calculated from the specific gravities of the respective layers and the layer configuration ratio (thicknesses of respective layers) of the samples, for which measurement of the degree of crystallization was carried out.

The specific gravities of the respective layers were calculated from the mixing ratio of the raw materials.

The layer configuration ratio of a film was measured as follows. A film was interposed and fixed between small-sized metal jacks, and the film was cut such that a cross-section of the film would be smooth using a single-edged knife. In a state of having the film disposed between the jacks, the film cross-section was observed at a magnification ratio of 50 times using a confocal laser microscope (VK-X110, manufactured by KEYENCE CORPORATION). The thickness of each layer was measured at ten sites, the average value was determined, and the layer configuration ratio was calculated from the results.

<Calculation of Ratio (%) Occupied by α-Crystals in Entire Crystal Component>

The ratio of α-crystals was determined by measuring an infrared absorption spectrum using an ATR unit (UMA-500) of FT-IR (main body: FTS-135) manufactured by Bio-Rad Laboratories, Inc.

From the spectrum thus obtained, the absorption intensity (peak height (A)) at a wave number of 840 $cm^{-1}$, which is characteristic absorption of β type crystals, and the absorption intensity (peak height (B)) at a wave number of 765 $cm^{-1}$, which is characteristic absorption of α type crystals, were determined, and the component ratio (%) of α type crystals was calculated by the following calculation formula.

$$(B)/((A)+(B)) \times 100(\%)$$

<Method for Evaluating Resistance to Acid Rain>

The front surface (iron plate 11) of the structure illustrated in FIG. 1 was heated to 80° C. with a hot plate, and 500 µl of a chemical solution having the following composition (artificial rain) was dropped on a vinylidene fluoride-based resin multi-layered film 1. After 3.5 hours, changes in the external appearance (discoloration and uplift of film) were evaluated.

(Composition of Chemical Solution)

| Anion solution | | |
|---|---|---|
| Sulfuric acid (98%) | JIS K8951 | 102.0 g |
| Hydrochloric acid (35%) | JIS K8180 | 200.0 g |
| Nitric acid (70%) | JIS K8541 | 42.9 g |
| Ion-exchanged water | | 655.1 g |
| Cation solution | | |
| Aqueous ammonia (28%) | JIS K8085 | 35.7 g |
| Calcium hydroxide (95%) | JIS K8575 | 10.5 g |
| Sodium hydroxide (95%) | JIS K8576 | 12.6 g |
| Potassium hydroxide (85%) | JIS K8574 | 1.2 g |
| Ion-exchanged water | | 940 g |

The anion solution was added to the cation solution until the mixture reached pH 1, and the mixture was stirred for 24 hours. After 24 hours, the mixture was adjusted again to pH 1, and the resultant was used as a test liquid.

Meanwhile, in FIG. 1, the decorative layer 4 is a white vinyl chloride sheet. The white vinyl chloride sheet includes DEHA (bis(2-ethylhexyl) adipate), DEHP (bis(2-ethylhexyl) phthalate), 2-hydroxy-4-n-octyloxybenzophenone, and DINP (diisononyl phthalate). Furthermore, the white vinyl chloride sheet contains 0.5% by mass of HALS.

Furthermore, the tacky adhesive layer 5 is formed from an acrylic tacky adhesive.

<Method of Evaluating Resistance to Yellowing in Dark Place>

The structure illustrated in FIG. 1 was introduced into an oven at 80° C. for 600 hours, and the change in the degree of yellowness, Δb, before and after the introduction into the oven was evaluated from the front surface layer side using a spectral colorimeter ZE6000 (manufactured by NIPPON DENSHOKU INDUSTRIES CO., LTD.).

Meanwhile, the decorative layer 4 and the tacky adhesive layer 5 are identical to those of the structure used for the method of evaluating the resistance to acid rain.

<Evaluation of Ultraviolet Cutting Properties>

Figure 2:
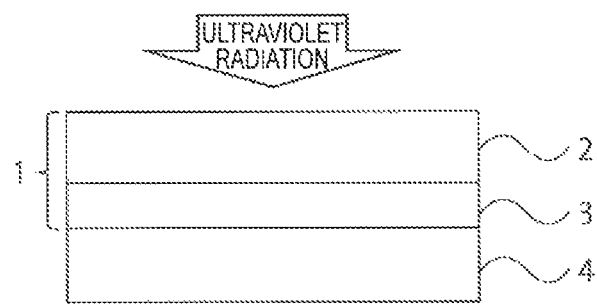
FIG. 2 is a diagram illustrating a structure used for an evaluation of ultraviolet cutting properties.

The structure illustrated in FIG. 2 was subjected to a weather resistance acceleration test using a metal weather ultraviolet irradiation testing machine under the following conditions, and the change in the degree of yellowness, Δb, of the structure before and after the test was evaluated.

Conditions

Ultraviolet irradiation intensity: 132 $mW/cm^2$

B.P. temperature: 63±3° C.

Irradiation/condensation cycle: 6 h/2 h

Meanwhile, the rear surface layer 3 of the vinylidene fluoride-based resin multi-layered film 1 contains 0.1% by mass of a phenolic oxidation inhibitor as an antioxidant. The decorative layer 4 is identical to that of the structure used for the method for evaluating the resistance to acid rain.

<Measurement of Melt Mass Flow Rate (MFR)>

The MFR was measured based on JIS K7210-1 at 240° C. under a load of 2.16 kgf. Regarding the measuring machine, MELT INDEXER F-F01 manufactured by Toyo Seiki Seisaku-sho, Ltd. was used.

<Results>

It is understood that when the content of a vinylidene fluoride-based resin in the front surface layer of the vinylidene fluoride-based resin multi-layered film is small, and the content of a methacrylic acid ester-based resin is large (Comparative Example 1), the methacrylic acid ester-based resin component is oxidized by acid rain, and yellowing occurs.

Furthermore, it is understood that when the degree of crystallization and the ratio of α-crystals are low (Comparative Examples 1 and 4), penetration of acid rain into the rear surface layer cannot be prevented, and the methacrylic acid ester-based resin of the rear surface layer is oxidized, and yellowing occurs.

Furthermore, it is understood that when the vinylidene fluoride-based resin multi-layered film is thick (Example 5), particularly when the front surface layer is thick (Example 6), the resistance to acid rain is excellent, and when the front surface layer is thin (Comparative Example 3), the resistance to acid rain is inferior.

Furthermore, it is understood that yellowing is strongly affected by the presence or absence of an ultraviolet absorber in the rear surface layer (Comparative Example 5).

Moreover, in a case in which the absolute value of the difference between the MFRs of the front surface layer and the rear surface layer of the vinylidene fluoride-based resin multi-layered film exceeds the range of 1.0 to 5.0 g/10 min (7.3 in Comparative Example 1), a tendency that the layer configuration was non-uniform in the width direction was observed.

INDUSTRIAL APPLICABILITY

The vinylidene fluoride-based resin multi-layered film of the present invention is appropriate for the use applications of car interior decoration of an instrument panel, a dashboard, a door, and the like, and car exterior decoration of a car body, a front bumper, a rear bumper, and the like. Furthermore, the vinylidene fluoride-based resin multi-layered film can also be used for films for interior and exterior decoration of infrastructures, various constructions, and the like, and for films for interior and exterior decoration of railway vehicles, aircrafts, ships, spacecrafts, and the like.

REFERENCE SIGNS LIST

1: vinylidene fluoride-based resin multi-layered film, 2: front surface layer, 3: rear surface layer, 4: decorative layer, 5: tacky adhesive layer, 11: iron plate.

The invention claimed is:

1. A vinylidene fluoride-based resin multi-layered film including two layers composed of a front surface layer laminated on a rear surface layer,
    wherein the front surface layer contains 80% by mass or more of a vinylidene fluoride-based resin and 20% by mass or less of a methacrylic acid ester-based resin, the degree of crystallization of the front surface layer is 45% or higher, the ratio occupied by α-crystals in the entire crystal component of the vinylidene fluoride-based resin is 60% or higher, the thickness of the front surface layer is 15 μm or more, and
    the rear surface layer contains 90% by mass or more of a methacrylic acid ester-based resin.

2. The vinylidene fluoride-based resin multi-layered film according to claim 1, wherein when a white thermoplastic resin layer is laminated immediately beneath the rear surface layer, and in a state in which the thermoplastic resin layer has been heated to 80° C., 500 μl of an acidic aqueous solution at pH 1 is dropped on the front surface layer side, the change in the degree of yellowness, Δb, after 3 hours and 30 minutes is 2 or less.

3. The vinylidene fluoride-based resin multi-layered film according to claim 1, wherein when a white thermoplastic resin layer containing a hindered amine-based light stabilizer is laminated immediately beneath the rear surface layer, and the thermoplastic resin layer is put in a dark place in an environment at 80° C. for 600 hours, the change in the degree of yellowness, Δb, is 2 or less.

4. The vinylidene fluoride-based resin multi-layered film according to claim 1, wherein the vinylidene fluoride-based resin contains a copolymer of vinylidene fluoride and hexafluoropropene and/or polyvinylidene fluoride.

5. The vinylidene fluoride-based resin multi-layered film according to claim 1, wherein the rear surface layer contains 10% by mass or less of a vinylidene fluoride-based resin.

6. The vinylidene fluoride-based resin multi-layered film according to claim 1, wherein the rear surface layer contains a triazine-based ultraviolet absorber in an amount of 0.01% to 10% by mass.

7. The vinylidene fluoride-based resin multi-layered film according to claim 1, wherein the total thickness including the front surface layer and the rear surface layer is 20 to 200 μm.

8. The vinylidene fluoride-based resin multi-layered film according to claim 1, wherein the vinylidene fluoride-based resin multi-layered film is laminated on a decorative film.

9. A decorative film comprising the vinylidene fluoride-based resin multi-layered film according to claim 1, wherein the multi-layered film comprises a decorative layer laminated on the rear surface layer.

10. A car or an automotive part, having the decorative film according to claim 9 adhered to a surface of the car or automotive part.

11. The vinylidene fluoride-based resin multi-layered film according to claim 1, wherein the multi-layered film comprises a decorative layer laminated on the rear surface layer and comprising a hindered amine-based light stabilizer.

12. The vinylidene fluoride-based resin multi-layered film according to claim 1, wherein the multi-layered film consists of the front surface layer and the rear surface layer.

13. The vinylidene fluoride-based resin multi-layered film according to claim 1, wherein the multi-layered film is produced by a method comprising molding a resin composition by melt extrusion by utilizing a T-type die, and the amount of conversive heat per unit time at the time of cooling the molten resin is 70 to 180 KW per kg of the molten resin according to a calculation formula represented by the following formula:

$$\text{amount of conversive heat} = \text{specific heat (J/kg·°C.)} \text{ of resin composition} \times \Delta T / \text{cooling time (sec)},$$

where ΔT=temperature of molten resin−temperature after cooling.

14. A method of producing the multi-layered film according to claim 1, the method comprising molding a resin composition by melt extrusion by utilizing a T-type die, wherein the amount of conversive heat per unit time at the time of cooling the molten resin is 70 to 180 KW per kg of the molten resin according to a calculation formula represented by the following formula:

$$\text{amount of conversive heat} = \text{specific heat (J/kg·°C.)} \text{ of resin composition} \times \Delta T / \text{cooling time (sec)},$$

where ΔT=temperature of molten resin−temperature after cooling.

15. The method of claim 14, wherein the molding of the resin composition by melt extrusion comprises the steps of:
    disposing a metal cooling roll and a rubber roll under a T-type die;
    extruding the molten resin through a lip port of the T-type die;
    pinching the extruded resin between the metal cooling roll and the rubber roll;
    and solidifying the resin by cooling.

* * * * *